Patented Mar. 12, 1940

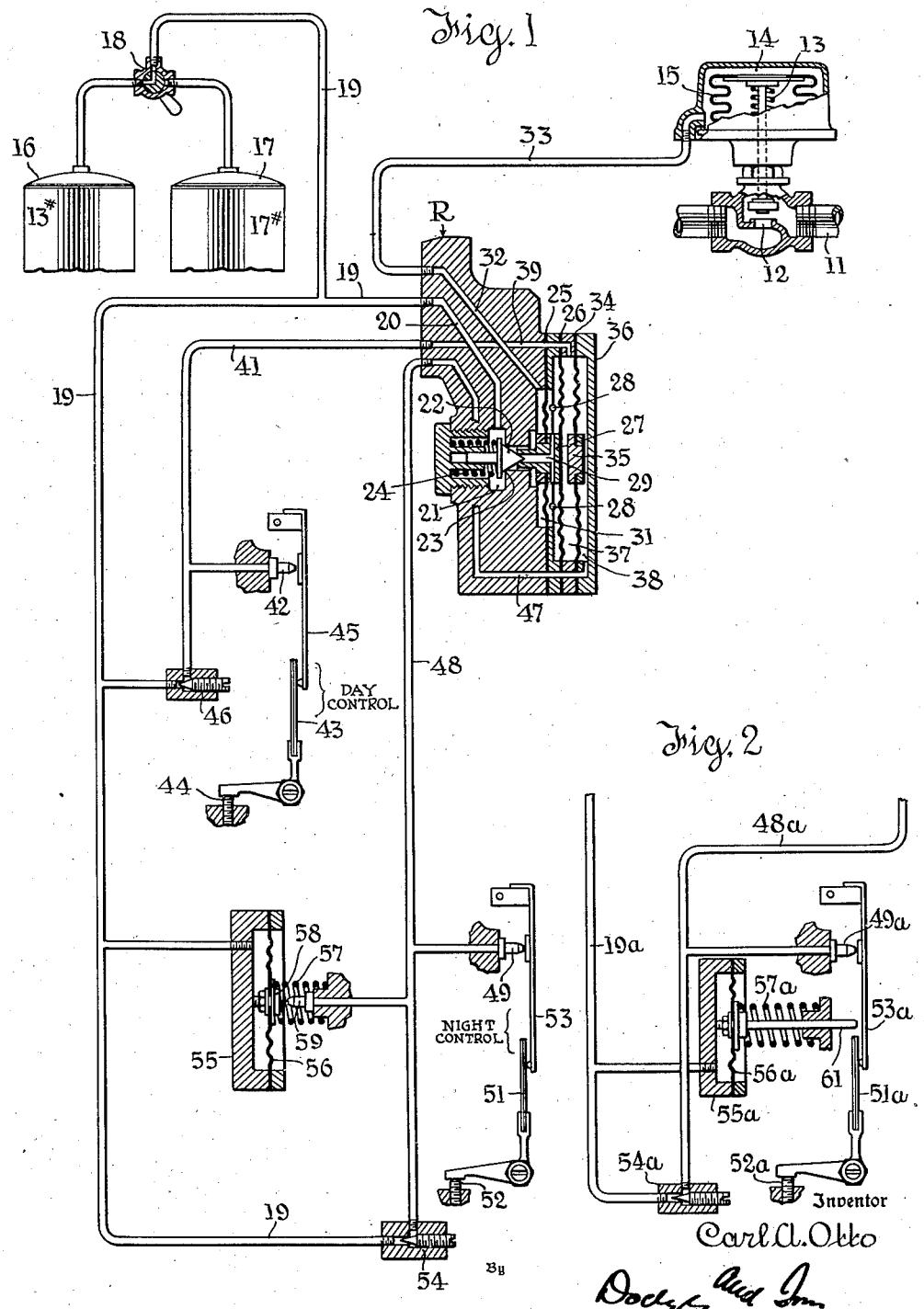

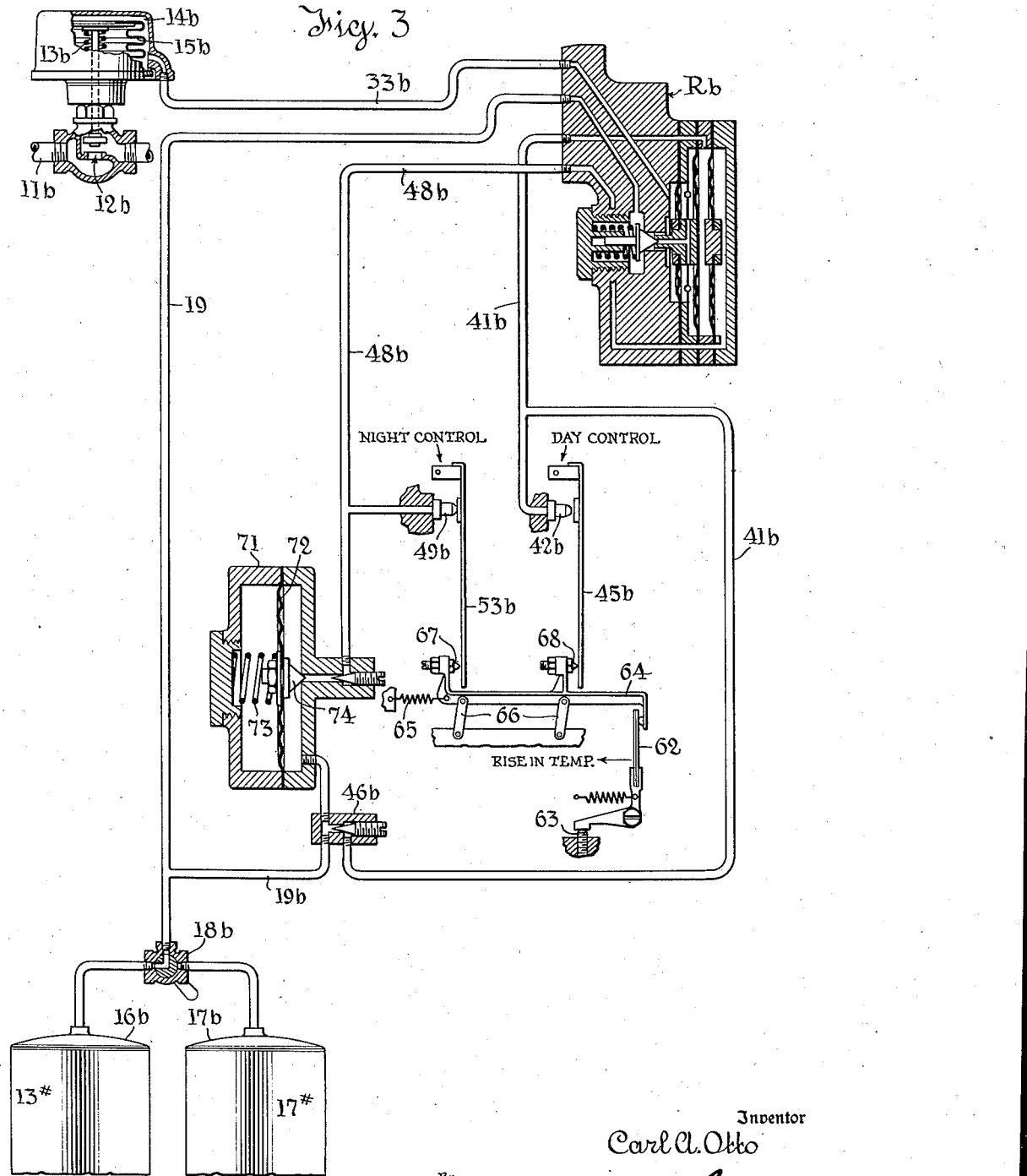

2,193,295

UNITED STATES PATENT OFFICE 2,193,295

TEMPERATURE REGULATION

Carl A. Otto, Milwaukee, Wis., assignor to Johnson Service Company, Milwaukee, Wis., a corporation of Wisconsin Application May 13, 1938, Serial No. 207,837

6 Claims. (Cl. 236—47)

This invention relates to temperature control systems and particularly to pneumatic leak port systems for schools, office buildings and the like, designed to maintain a normal (day) temperature during periods of occupancy and a lower (night) temperature at other times.

One system in extensive use by applicant's assignee controls a single leak port motor alternatively by two differently adjusted thermostatic bars and selects between these bars by changing the supply pressure in the system. Selection is made by shifting to an inactive position that bar which normally acts in advance of the other, such shifting permitting the later acting bar to become effective to control the leak port. See the patent to Fortier, 1,597,350, August 24, 1926.

The present invention uses two leak port motors each with its own leak valve controlled each by a distinct and differently adjusted thermostat (or alternatively, controlled by a single thermostat at two different points in its responsive movement). The motors are rendered effective alternately preferably by means responsive to changes in supply pressure, though other known controlling means can be used. The simplest selection is effected by venting that motor which normally acts in advance of the other so that the other, whose action normally is anticipated, is permitted to become effective.

Another simple means for selecting is to cut off the supply of motive fluid from the motor which normally acts in advance. The motor is then vented by its leak port which even when normally closed permits minute leakage sufficient to render it completely inert in a short time.

The invention is capable of several embodiments a number of which will be described. Since a relay accelerates response and rapid response is usually desirable, the two motors will be shown as controlling through a relay valve, but as is well known in the art the relay valve can be dispensed with where rapid response is not essential. When a relay valve is used the motors become the controlling diaphragms for the relay and are arranged in tandem.

In the various figures equipment for only one room is shown but in practice a plurality of such room equipments would commonly be connected with a single supply line and all to be adjusted in unison for day or night settings. This is familiar practice.

In the drawings:

Figure 1 is a diagram, largely sectional, showing one embodiment in which the night control motor is vented by a separate venting valve;

Fig. 2 is a fragmentary view showing a modification of the structure of Fig. 1 in which the venting is effected by holding the leak port lid of the night motor open;

Fig. 3 is a view similar to Fig. 1 showing a further modified embodiment.

Referring first to Fig. 1 which shows a temperature responsive device set for day operation, the temperature changing medium (say hot water or steam) flows to radiators or the like (not shown) through pipe 11 and flow is controlled by valve 12. The valve is normally held open by spring 13 and may be forced closed by pressure fluid (compressed air) admitted to chamber 14 and then reacting downward on bellows 15.

The source of pressure fluid comprises two tanks 16 maintained at 13 pounds gauge, and 17 maintained at 17 pounds gauge by any suitable means (not shown). A three way valve 18 connects the tanks 16 and 17 selectively with the supply line 19 which has a number of branches as shown.

One branch leads to the supply connection of relay R which is constructed according to the patent to Otto 1,500,260, July 8, 1924, except that it includes an extra diaphragm and motor chamber. This relay involves features of novelty not claimed herein but forming the subject matter of my application, Serial No. 229,636, filed September 12, 1938.

The supply line 19 leads by port 20 to chamber 21 behind cone valve 22 urged toward supply seat 23 by coil compression spring 24. A pair of flexible diaphragms 25, 26 connected at their center by hub 27 control the valve 22. The space between the diaphragms is vented to atmosphere at 28 and diaphragm 26 which is the primary motor diaphragm has slightly the larger area. An axial exhaust port 29 leads to the space between the diaphragms 25, 26.

In the normal position of the diaphragms port 29 vents chamber 31 to the rear of diaphragm 25. This space is connected by port 32 and line 33 with chamber 14. When the diaphragms 25, 26 move inward valve 22 first closes exhaust port 29 and then is forced from seat 23 to admit air from chamber 21 to chamber 31.

A third diaphragm 34 which is the secondary motor diaphragm is mounted in front of diaphragm 26 and carries at its center a thrust button 35 adapted to engage hub 27. A cap 36 overlies diaphragm 34 the parts being so arranged that two motor chambers are formed, a primary motor chamber 37 between diaphragms 26 and 34 and a secondary motor chamber 38 between diaphragm 34 and cap 36.

Pressures in motor chambers 37 and 38 selectively operate the relay to establish a related pressure in chamber 31 and the connected motor chamber 14. The dominant pressure as between motor chambers 37 and 38 takes control.

Primary motor chamber 37 is connected by passage 39 and line 41 with leak port 42 controlled by "day" thermostatic bar 43 adjusted by screw 44 for a temperature of say 70° F. Control is exercised by moving in an opening direction on fall of temperature the hinged gravitating valve lid 45 which tends to close the leak port and does close it when temperature rises to the control point. Air is supplied to line 41 from line 19 through needle valve 46 which is set to a flow capacity less than the maximum capacity of port 42.

Secondary motor chamber 38 is connected by port 47 and line 48 with leak port 49 controlled by "night" thermostatic bar 51 adjusted by screw 52 for a temperature of say 50° F. Control is exercised by moving in an opening direction on fall of temperature the hinged gravitating valve lid 53 which tends to close the leak port and does close it when temperature rises to the control point. Air is supplied from line 19 to line 48 through needle valve 54 adjusted to a capacity less than that of leak port 49.

On rising temperature night bar 51 closes port 49 and hence causes closing of valve 12 while leak port 42 is still open. Thus motor chamber 38 is under pressure and motor chamber 37 vented. To allow bar 43 to take control, motor chamber 38 is vented.

To effect this action a motor comprising body 55 and flexible diaphragm 56 is connected with supply line 19 and loaded by spring 57 of such strength that supply pressure at 13 pounds gauge will not, and at 17 pounds gauge will, overpower the spring. When the diaphragm 56 shifts under pressure it seals valve 58 against vent 59 to close the same.

Thus when valve 18 is set to supply air at 13 pounds, line 48 is vented and day bar 43 controls, whereas when valve 18 is set to supply air at 17 pounds, night bar 51 controls in a temperature range through which leak port 42 is open. In this way, motor diaphragms 26 and 34 are rendered alternatively effective to control valve 12.

As stated, the relay action between these motor diaphragms and valve 12 is considered desirable but not essential.

In Fig. 2, in which similar parts are similarly numbered with the distinguishing letter $a$, the motor 55a, 56a is shown as acting at the higher (17 pound) pressure to force back lid 53a by means of stem 61 and thus vent line 48a. In this case, day pressure would be 17 pounds and night pressure 13 pounds, but otherwise the operation is essentially the same.

In Fig. 3 possible modifications of a number of features used in Fig. 1 are shown. Parts functionally identical with Fig. 1 are given the same numerals with the letter $b$. The relay $Rb$, which contains the primary and secondary motor chambers is identical with relay R and the components hence are not numbered in Fig. 3.

In this figure a single thermostatic bar 62 is substituted for two distinct bars. The showing is diagrammatic and commercial devices can be variously arranged. As shown the bar 62 adjustable by screw 63 shifts bar 64 against the reaction of a very light spring 65. Bar 64 is guided by radius links 66 and carries two thrust screws 67, 68 which engage lids 53b and 45b respectively. The adjustment is such that lid 53b closes at a lower temperature than lid 45b. The action is the same as that secured by two differently adjusted bars.

Instead of venting line 48b directly the supply of air to the line is cut off after which the minute unavoidable leakage at port 49b will vent the motor chamber which it controls even if lid 53b be then in closing position.

To cut off the supply to line 48b when supply pressure is at the low (13 pound) value use is made of a motor comprising a housing 71 with diaphragm 72 loaded by spring 73 and carrying valve 74. Valve 74 opens and closes as supply pressure is shifted between 17 and 13 pounds and the effect, as in the device of Fig. 1, is to render the night leak port and related motor chamber alternately active and inactive.

What is claimed is:

1. The combination of a source of pressure fluid; means for controlling a temperature changing medium; two pressure motors each arranged to control said controlling means, and so arranged that one of the two when active supersedes the other; means controlling the pressure developed in each motor, each such means including a pair of restricted ports, one of each pair controlling supply from said source to, and the other controlling exhaust from the corresponding motor, one port of each pair being of variable capacity; thermostatic means for varying the capacity of the variable capacity ports to exercise two different controls on the pressures in the two motors; means for venting the dominant motor; and means for actuating the venting means from a remote point.

2. The combination of a source of pressure fluid; means for controlling a temperature changing medium; two pressure motors each arranged to control said controlling means, and so arranged that one of the two when active supersedes the other; means controlling the pressure developed in each motor, each such means including a pair of restricted ports, one of each pair controlling supply from said source to, and the other controlling exhaust from the corresponding motor, one port of each pair being of variable capacity; thermostatic means for varying the capacity of the variable capacity ports to exercise two different controls on the pressures in the two motors; means for venting the dominant motor; a pressure motor for actuating said venting means shiftable by variations of the pressure at which pressure fluid is supplied to said motors; and means for varying the last named pressure.

3. The combination defined in claim 1 in which the means for venting the dominant motor comprises means for inhibiting the supply of motive fluid thereto and the motor is characterized by a normally negligible leakage which becomes effective upon the termination of supply.

4. The combination of a source of pressure fluid; means for controlling a temperature changing medium; two pressure motors each arranged to control said controlling means, and so arranged that they take control selectively according to their comparative degrees of pressure; means for controlling the pressure in each motor, each such means including two restricted ports one regulating supply from the source to, and the other regulating exhaust from the corresponding motor, at least one of said ports being of variable capacity; thermostatic means for varying the capacity of the variable capacity ports to exercise two different controls on the pressures in the two motors; means for venting one motor, such venting permitting the other to take control; and means for operating said venting means from a remote point.

5. The combination defined in claim 4 in which means are provided to vary the pressure at which pressure fluid is supplied, and the means for operating the venting means is a loaded pressure motor responsive to variation of supply pressure.

6. The combination with the structure defined in claim 4 of a regulating motor for operating said medium controlling means; and a supply and exhaust relay valve operable by said two pressure motors and controlling the admission of pressure fluid from said source to and its exhaust from said regulating motor.

CARL A. OTTO.